(12) United States Patent
Honma

(10) Patent No.: US 8,130,390 B2
(45) Date of Patent: Mar. 6, 2012

(54) IMAGE DATA TRANSMITTING APPARATUS, SERVER APPARATUS, IMAGE DATA TRANSMITTING SYSTEM, AND PROGRAM

(75) Inventor: Tomoyuki Honma, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 981 days.

(21) Appl. No.: 12/079,564

(22) Filed: Mar. 27, 2008

(65) Prior Publication Data

US 2009/0201557 A1 Aug. 13, 2009

(30) Foreign Application Priority Data

Apr. 4, 2007 (JP) ................................. 2007-098372

(51) Int. Cl.
  *G06K 15/00* (2006.01)
  *G06F 3/12* (2006.01)
  *G03G 15/00* (2006.01)
(52) U.S. Cl. .......................... 358/1.14; 358/1.15; 399/80
(58) Field of Classification Search .................. 358/1.14, 358/1.15; 399/79, 80; 380/243–246
  See application file for complete search history.

(56) References Cited

U.S. PATENT DOCUMENTS

| | | | |
|---|---|---|---|
| 7,239,434 | B2 | 7/2007 | Endo |
| 2001/0056538 | A1 | 12/2001 | Amano |
| 2003/0030846 | A1 | 2/2003 | Mori et al. |
| 2003/0117665 | A1 | 6/2003 | Eguchi et al. |
| 2005/0071500 | A1 * | 3/2005 | Tonegawa ..................... 709/236 |
| 2006/0064597 | A1 * | 3/2006 | Hatano ........................ 713/179 |
| 2006/0173964 | A1 * | 8/2006 | Oohama et al. .............. 709/206 |
| 2007/0046976 | A1 | 3/2007 | Kasatani |
| 2007/0263258 | A1 * | 11/2007 | Tsuchibuchi et al. ......... 358/400 |

FOREIGN PATENT DOCUMENTS

| | | |
|---|---|---|
| JP | 07-058898 | 3/1995 |
| JP | 10-233876 | 9/1998 |
| JP | 11-215339 | 8/1999 |
| JP | 2002-010008 | 1/2002 |
| JP | 2002-320043 | 10/2002 |
| JP | 2003-032404 | 1/2003 |
| JP | 2003-189051 | 7/2003 |
| JP | 2005-244566 | 9/2005 |
| JP | 2006-087028 | 3/2006 |
| JP | 2006-340401 | 12/2006 |
| JP | 2007-067840 | 3/2007 |

\* cited by examiner

*Primary Examiner* — Twyler Haskins
*Assistant Examiner* — Fred Guillermety
(74) *Attorney, Agent, or Firm* — David G. Conlin; Steven M. Jensen; Edwards Wildman Palmer LLP

(57) ABSTRACT

The image data transmitting apparatus acquires the address book data corresponding to the user or such data and the transmittal cover letter data from the server apparatus, selects, out of the acquired information on destinations, the destination according to selecting operation by the user, generates transmittal cover letter image data based on the transmittal cover letter data related to the selected destination and attaches the image data to be transmitted as second and subsequent pages, thereby generating the image data with the transmittal cover letter attached thereto. While thus generated image data with the transmittal cover letter attached thereto is transmitted to the destination, transmission is prohibited of image data other than thus generated image data with the transmittal cover letter attached thereto.

7 Claims, 11 Drawing Sheets

FIG. 2A

REGISTRATION OF DESTINATION

DESTINATION
NAME                        AAA
KIND OF TRANSMISSION        FAX
DESTINATION ADDRESS         0743-00-0000

TRANSMISSION SETTING
TRANSMITTAL COVER LETTER    SAMPLE A
PAPER SIZE                  A4
RESOLUTION                  200x200 dpi
COLOR MODE                  MONOCHROME
FILE FORMAT                 TIF
COMPRESSION FORMAT          MMR
TRANSFER TO ADMINISTRATOR   E-mail

[ OK ]  [ CANCEL ]

FIG. 2B

REGISTRATION OF DESTINATION

DESTINATION
NAME                        AAA
KIND OF TRANSMISSION        FAX
DESTINATION ADDRESS         0743-00-0000

TRANSMISSION SETTING
TRANSMITTAL COVER LETTER    NONE
PAPER SIZE     ☐A3  ☑A4  ☑A5  ☐B4  ☑B5
RESOLUTION     ☑200x200 dpi  ☐400x400dpi
COLOR MODE     MONOCHROME
FILE FORMAT    TIF
COMPRESSION FORMAT  ☐MR  ☐MH  ☑MMR
TRANSFER TO ADMINISTRATOR  E-mail

[ OK ]  [ CANCEL ]

FIG. 3A

REGISTRATION OF DESTINATION (User1)

| DESTINATION | |
|---|---|
| NAME | AAA |
| KIND OF TRANSMISSION | FAX |
| DESTINATION ADDRESS | 0743-00-0000 |
| | |
| TRANSMISSION SETTING | |
| TRANSMITTAL COVER LETTER | SAMPLE A |
| PAPER SIZE | A4 |
| RESOLUTION | 200x200 dpi |
| COLOR MODE | MONOCHROME |
| FILE FORMAT | TIF |
| COMPRESSION FORMAT | MMR |
| TRANSFER TO ADMINISTRATOR | E-mail |

[ OK ] [ CANCEL ]

FIG. 3B

REGISTRATION OF DESTINATION (User2)

| DESTINATION | |
|---|---|
| NAME | AAA |
| KIND OF TRANSMISSION | FAX |
| DESTINATION ADDRESS | 0743-00-0000 |
| | |
| TRANSMISSION SETTING | |
| TRANSMITTAL COVER LETTER | SAMPLE B |
| PAPER SIZE | A5 |
| RESOLUTION | 200x200 dpi |
| COLOR MODE | MONOCHROME |
| FILE FORMAT | TIF |
| COMPRESSION FORMAT | MMR |
| TRANSFER TO ADMINISTRATOR | E-mail |

[ OK ] [ CANCEL ]

FIG. 4

REGISTRATION OF DESTINATION

| | |
|---|---|
| PERMITTED USER | User1, User3 |
| DESTINATION | |
| NAME | AAA |
| KIND OF TRANSMISSION | FAX |
| DESTINATION ADDRESS | 0743-00-0000 |
| TRANSMISSION SETTING | |
| TRANSMITTAL COVER LETTER | SAMPLE A |
| PAPER SIZE | A4 |
| RESOLUTION | 200x200 dpi |
| COLOR MODE | MONOCHROME |
| FILE FORMAT | TIF |
| COMPRESSION FORMAT | MMR |
| TRANSFER TO ADMINISTRATOR | E-mail |

[ OK ]  [ CANCEL ]

DATE,100,10,50,10
TIME,150,10,50,10
NAME,0,20,100,10
FAX NUMBER,0,30,100,10
IMAGE,10,40,180,100,SAMPLE.bmp
TEXT,10,80,100,30, WE ARE SENDING A QUOTATION AND YOUR CONFIRMATION WOULD BE APPRECIATED.

| USER NAME | DESTINATION INFORMATION | | | TRANSMISSION SETTING INFORMATION | | | |
|---|---|---|---|---|---|---|---|
| | NAME | KIND | ADDRESS | TRANSMITTAL COVER LETTER | PAPER | RESOLUTION | ... |
| User1 | AAA | FAX | 0743… | SAMPLE A | A4 | 200x200 dpi | ... |
| User1 | III | E-Mail | a@com | NONE | (NONE) | 300x300 dpi 600x600 dpi | ... |
| User2 | AAA | FAX | 0743… | SAMPLE A | A4 A5 B5 | 200x200 dpi | ... |
| User3 | UUU | I-Fax | b@com | SAMPLE B | (NONE) | 200x200 dpi 400x400 dpi 600x600 dpi | ... |
| ... | ... | ... | ... | ... | ... | ... | ... |

38

IMAGE DATA TRANSMITTING APPARATUS, SERVER APPARATUS, IMAGE DATA TRANSMITTING SYSTEM, AND PROGRAM

CROSS-NOTING PARAGRAPH

This Nonprovisional application claims priority under 35 U.S.C. §119(a) on Patent Application No. 2007-098372 filed in JAPAN on Apr. 4, 2007, the entire contents of which are hereby incorporated herein by references.

FIELD OF THE INVENTION

The present invention relates to an image data transmitting apparatus, a server apparatus, an image data transmitting system, and a program, and more particularly, relates to an image data transmitting apparatus that transmits image data with attachment of a transmittal cover letter by specifying a destination, a server apparatus connected thereto, an image data transmitting system comprising the image data transmitting apparatus and the server apparatus, and a program to be installed in the image data transmitting apparatus.

BACKGROUND OF THE INVENTION

Conventionally, image data transmitting apparatuses have been in circulation in the market such as a facsimile device and a multi-function peripheral having a facsimile function and an internet facsimile function. Such image data transmitting apparatuses have a function of transmitting image data to an address of a pre-registered receiving party or an address of a receiving party input at the time of transmission.

Japanese Laid-Open Patent Publication No. 7-58898 discloses a client-server facsimile system that, to reduce the trouble of registering data of a receiving party in a telephone directory, at the time of finishing a transmission to a non-registered destination, registers setting used for such transmission in relation to the destination in the telephone directory.

Japanese Laid-Open Patent Publication No. 11-215339 discloses a document transmitting device that has the operability at the time of document transmission enhanced by, for example, enabling setting of a transmission method and an address by specifying a destination's name, enabling resetting of an appropriate address in accordance with a change of the transmission method, automatically selecting the transmission method and the address based on conditions such as degree of secrecy, degree of urgency, and attribute of the document, place of installation of the device, and line condition, and automatically generating and transmitting a transmittal cover letter notifying the transmission of document data. This document transmitting device automatically selects a detailed destination from an address book in accordance with predetermined conditions, automatically generates the transmittal cover letter from predetermined conditions, and transmits the cover letter. Here, the transmittal cover letter is automatically generated by inserting an abstract destination (destination's name), date and time, number of pages of the document, the transmission method (FAX/e-mail/file transfer protocol, etc.), the detailed destination (address of destination), and a fixed-form sentence into a blank document.

Furthermore, Japanese Laid-Open Patent Publication No. 2006-87028 discloses an image forming device aimed at enhanced efficiency of address book managing processing. An address book management portion of this image forming device builds an address book management mechanism by separating a destination management of managing destination data used for transmission processing and a selection management of managing selection of the destination data by users, and furthermore, uses an address book class in charge of the destination management, a selection sheet class in charge of the selection management, a bookshelf class bundling the address book classes, destination classes corresponding to individual destinations, a transmittal cover letter class for managing the transmission to the selected destination, an existing destination selection sheet class that is a subclass of the selection sheet class and is specialized in selection of an existing destination, and an additional destination selection sheet class that is a subclass of the selection sheet class and is specialized in the selection of newly input destinations.

However, in the system described in Japanese Laid-Open Patent Publication No. 7-58898, while it is possible to extract items necessary for registration in the telephone directory and automatically register these items, the system is configured so that the user is requested by the system to register lacking data and the user is free to change the items for the registration in the telephone directory. Furthermore, in the systems described in Japanese Laid-Open Patent Publication No. 11-215339 and Japanese Laid-Open Patent Publication No. 2006-87028 as well, the address may be registered in the document transmitting device or image forming device that performs data transmission and the transmittal cover letter at the time of transmission may also be changed in such device.

Therefore, conventional technologies such as the technology described in Japanese Laid-Open Patent Publication No. 7-58898 had a problem that even if a administrator sets appropriate transmission setting information for the transmittal cover letter, etc., in the address book, individual users may change such transmission setting information or the individual users may transmit inappropriate transmittal cover letter when they make transmission to important contractors.

In the device described in Japanese Laid-Open Patent Publication No. 11-215339, the transmittal cover letter comprising the fixed form sentence, etc., is not particularly determined in accordance with a destination and in the devices described in Japanese Laid-Open Patent Publication No. 11-215339 and Japanese Laid-Open Patent Publication No. 2006-87028, the transmittal cover letter is not determined in accordance with the relationship between the user (sender) and the destination.

SUMMARY OF THE INVENTION

The present invention was conceived in view of the actual situation as described above and the object of the present invention is to provide an image data transmitting apparatus that, when a destination is specified, may transmit image data solely with attachment of a user-unchangeable transmittal cover letter corresponding to such destination, a server apparatus connected thereto, an image data transmitting system comprising the image data transmitting apparatus and the server apparatus, and a program to be installed in the image data transmitting apparatus.

To solve the above problems, the image data transmitting apparatus according to the present invention is an image data transmitting apparatus connected to a server apparatus by way of a network, the server apparatus having stored thereon address book data in which information on destinations, information on users who use the image data transmitting apparatus, and transmission setting information indicative of transmittal cover letter data to be used are related to each other, the image data transmitting apparatus or the server apparatus having the transmittal cover letter data stored thereon, the image data transmitting apparatus comprising a data acquiring portion that acquires the address book data corresponding to the user or such address book data and the transmittal cover letter data from the server apparatus, a destination selecting portion that, out of the information on destinations acquired by the data acquiring portion, selects the destination according to selecting operation by the user, an image data generating portion that generates image data of the transmittal cover letter based on the transmittal cover letter data related to the destination selected by the destination selecting portion and attaches image data to be transmitted as second and subsequent pages, thereby generating the image data with the transmittal cover letter attached thereto, and an image data transmitting portion that transmits the image data with the transmittal cover letter attached thereto generated by the image data generating portion to the destination, wherein the image data transmitting portion prohibits transmission of image data other than the image data with the transmittal cover letter attached thereto generated by the image data generating portion.

The server apparatus according to the present invention is a server apparatus connected to an image data transmitting apparatus by way of a network, the server apparatus comprising a memory portion that stores address book data in which information on destinations, information on users who use the image data transmitting apparatus, and transmission setting information indicative of transmittal cover letter data to be used are related to each other or such address book data and the transmittal cover letter data, and a data transmitting portion that, in response to a request to acquire from the image data transmitting apparatus, reads out the requested address book data corresponding to the user of the image data transmitting apparatus or such address book data and the transmittal cover letter data from the memory portion and transmits such data.

The image data transmitting system according to the present invention is an image data transmitting system comprising a server apparatus and an image data transmitting apparatus connected to the server apparatus by way of a network, the server apparatus having stored thereon address book data in which information on destinations, information on users who use the image data transmitting apparatus, and transmission setting information indicative of transmittal cover letter data to be used are related to each other, the image data transmitting apparatus or the server apparatus having the transmittal cover letter data stored thereon, the image data transmitting apparatus comprising a data acquiring portion that acquires the address book data corresponding to the user or such address book data and the transmittal cover letter data from the server apparatus, a destination selecting portion that, out of the information on destinations acquired by the data acquiring portion, selects the destination according to selecting operation by the user, an image data generating portion that generates image data of the transmittal cover letter based on the transmittal cover letter data related to the destination selected by the destination selecting portion and attaches the image data to be transmitted as second and subsequent pages, thereby generating the image data with the transmittal cover letter attached thereto, and an image data transmitting portion that transmits the image data with the transmittal cover letter attached thereto generated by the image data generating portion to the destination, wherein the image data transmitting portion prohibits transmission of image data other than the image data with the transmittal cover letter attached thereto generated by the image data generating portion.

The program according to the present invention is a program to be installed in a control portion of an image data transmitting apparatus connected to a server apparatus by way of a network, the server apparatus having stored thereon address book data in which information on destinations, information on users who use the image data transmitting apparatus, and transmission setting information indicative of transmittal cover letter data to be used are related to each other, the image data transmitting apparatus or the server apparatus having the transmittal cover letter data stored thereon, the program operable to cause the control portion of the image data transmitting apparatus to execute a data acquiring step of acquiring the address book data corresponding to the user or such address book data and the transmittal cover letter data from the server apparatus, a destination selecting step of selecting, out of the information on destinations acquired by the data acquiring step, the destination according to selecting operation by the user, an image data generating step of generating image data of the transmittal cover letter based on the transmittal cover letter data related to the destination selected by the destination selecting step and attaching the image data to be transmitted as second and subsequent pages, thereby generating image data with the transmittal cover letter attached thereto, and an image data transmitting step of transmitting the image data with the transmittal cover letter attached thereto generated by the image data generating step to the destination, wherein the image data transmitting step includes prohibiting transmission of image data other than the image data with the transmittal cover letter attached thereto generated by the image data generating step.

BRIEF DESCRIPTION OF THE DRAWINGS

FIGS. 2A and 2B are diagrams of examples of a registration screen of destination information in a server apparatus of FIG. 1;

FIGS. 3A and 3B are diagrams of examples of the registration screen of the destination information for each user in the server apparatus of FIG. 1;

FIG. 4 is a diagram of another example of the registration screen of the destination information for each user in the server apparatus of FIG. 1;

FIG. 6 is a diagram of one example of address book data to be stored in the server apparatus of FIG. 1;

PREFERRED EMBODIMENTS OF THE INVENTION

An image data transmitting apparatus according to the present invention is an apparatus to be connected by way of a network to a server apparatus that stores information on destinations. An image data transmitting system according to the present invention is a system comprising one or more than one image data transmitting apparatuses and the server apparatus. Here, the server apparatus may be configured to be distributed.

Various machines and devices are applicable as the image data transmitting apparatus, such as a facsimile device and a multi-function peripheral or a PC having at least any one of a facsimile function of transmitting read-in image data by way of a voice network, an ISDN network, etc., an internet facsimile function of transmitting the read-in image data as an attached file of an electronic mail, and a file transfer function of transmitting the read-in image data by a file transfer protocol (FTP). When the PC is employed, there are cases in which connection to a scanner device is required depending on the material to be transmitted. The image data transmitting apparatus is generally configured to have not only an image data transmitting function but also an image data receiving function and in such case, may be called an image data communicating apparatus.

Figure 1:
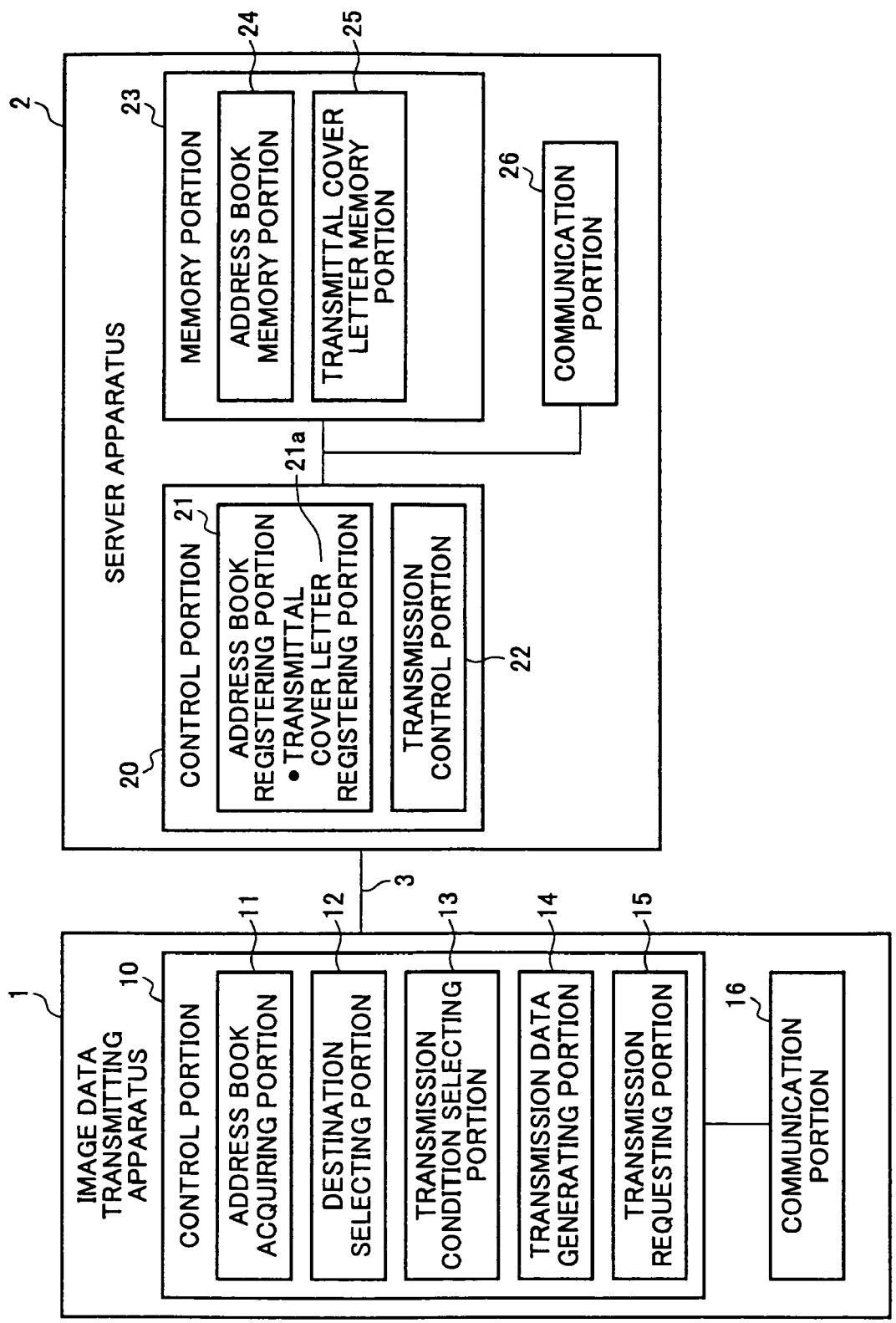
FIG. 1 is a block diagram of one configuration example of an image data transmitting system according to one embodiment of the present invention.

FIG. 1 is a block diagram of one configuration example of the image data transmitting system according to one embodiment of the present invention. In FIG. 1, reference numeral 1 represents the image data transmitting apparatus, reference numeral 2 represents the server apparatus, and reference numeral 3 represents the network. The image data transmitting apparatus 1 exemplified by FIG. 1 comprises a control portion 10 and a communication portion 16 and the server apparatus 2 comprises a control portion 20, a memory portion 23, and a communication portion 26. An internet network, an intranet network, or a LAN network, etc., correspond to the network 3.

In the server apparatus 2, the memory portion 23 consists of a memory means such as a hard disc and comprises an address book memory portion 24 that stores address book data including information on destinations (receivers) to which to transmit and a transmittal cover letter memory portion 25 that stores transmittal cover letter data. In the following, description will be made showing, as the transmittal cover letter data, the data that becomes a prescribed part of the transmittal cover letter to be transmitted and becomes a base of the transmittal cover letter, which is a preferable example, but the transmittal cover letter data may be the image data itself of the transmittal cover letter. The communication portion 26 executes various data exchanges with the image data transmitting apparatus 1 by way of the network 3.

The control portion 20 comprises an address book registering portion 21 that registers information on the destinations and generates the address book data and a transmission control portion 22. For example, it may be so arranged that the control portion 20 is provided with hardware such as a CPU, a ROM, a hard disc, etc., as a program storage area, and a RAM as a working area and that a predetermined control program is stored in the ROM, the hard disc, etc. This enables the CPU to read out the predetermined control program stored in the ROM, etc., onto the RAM and execute the program, thereby realizing the function of the control portion 20 including the functions of the address book registering portion 21 and the transmission control portion 22.

The address book registering portion 21 has a transmittal cover letter registering portion 21a that performs generation and registration of the transmittal cover letter data. The transmittal cover letter data is registered at the transmittal cover letter memory portion 25. The address book data generated at the address book registering portion 21 is stored in the address book memory portion 24. The address book registering portion 21 registers information on users of the image data transmitting apparatus 1, information on destinations, and transmission setting information indicative of the transmittal cover letter data to be used, with these types of information related to each other. As a result, the memory portion 23 stores the address book data in which the information on the destinations, the information on the users who use the image data transmitting apparatus 1, and the transmission setting information indicative of the transmittal cover letter data to be used are related to each other and the transmittal cover letter data.

The transmission control portion 22 controls so that, in response to a request to acquire an address book from the image data transmitting apparatus 1, the address book data and the transmittal cover letter data are read out from the address book memory portion 24 and the transmittal cover letter memory portion 25, respectively, and are transmitted by the communication portion 26. Here, it should be so arranged that, depending on the kind of request, such as the request to acquire only the address book (information on destinations), the request to acquire the address book data other than the address book, and the request to acquire the transmittal cover letter data, corresponding data will be returned. As exemplified in the transmission control portion 22 and the communication portion 26, the server apparatus 2 is provided with a data transmitting portion that reads out from the memory portion 23 the data corresponding to the request to acquire from the image data transmitting apparatus 1 and transmits the data.

On the other hand, in the image data transmitting apparatus 1, the control portion 10 comprises an address book acquiring portion 11, a destination selecting portion 12, a transmission condition selecting portion 13, a transmission data generating portion 14, and a transmission requesting portion 15 and performs the control to acquire the data required for image data transmission from the server apparatus 2 and the control to actually transmit the image data. For example, the control portion 10, like the control portion 20, is provided with the hardware such as the CPU, the ROM, and RAM and by storing a predetermined control program in the ROM, hard disc, etc., is capable of realizing the function of the control portion 10 including the functions of respective portions 11 to 15.

The communication portion 16 performs various data exchanges with the server apparatus 2 by way of the network 3 and transmits the image data to be transmitted to the destination. The transmission itself of the image data differs depending on the form of transmission. Configurations may be employed such as the configuration of transmitting by use of the network 3 connected to the server apparatus 2, the configuration of transmitting by use of a different line (such as above voice network and ISDN network), and further, the configuration of the server apparatus 2 becoming a transmitting server device, firstly receiving the image data and then transmitting it. In respect of the image data itself, the data such as the data obtained by reading the image by a scanner and the data preliminarily stored in the image data transmitting apparatus may be the data to be transmitted.

The address book acquiring portion 11 acquires the address book stored in the memory portion 23 of the server apparatus 2, using the communication portion 16. Here, various requests such as the request to acquire only the address book (information on the destinations), the request to acquire the address book data other than the address book, and the request to acquire the transmittal cover letter data are executed as appropriate, and the data corresponding to the request is acquired from the server apparatus 2. For example, the transmittal cover letter data does not necessarily need to be acquired at the time of acquiring the address book data but may be acquired after the destination is selected. The address book acquiring portion 11 is simply required to acquire, out of the address book data stored in the address book memory portion 24, only a part thereof related to the corresponding user.

As exemplified in the address book acquiring portion 11 and the communication portion 16, the image data transmitting apparatus 1 is provided with a data acquiring portion that acquires the address book data corresponding to the user (the information on the destinations and the transmission setting information) and the transmittal cover letter data from the server apparatus 2. However, it may be so arranged that, without acquiring the information on the transmittal cover letter out of the transmission setting information, only the transmittal cover letter data itself is acquired.

The destination selecting portion 12, composed of an input device such as an operation button and a keyboard, a display device, and a UI such as a graphical user interface (GUI), selects the destination from the address book acquired at the address book acquiring portion 11. As exemplified in the destination selecting portion 12, the image data transmitting apparatus 1 is provided with a destination selecting portion that performs the selection of the destination in accordance with the selecting operation by the user out of thus acquired information on the destinations.

The transmission condition selecting portion 13 automatically selects the transmittal cover letter data related to each destination in the address book. The transmission data generating portion 14 combines the transmittal cover letter image data generated by substituting a date, a user name, an addressee's name, etc., (different depending on the transmittal cover letter data) from the transmittal cover letter data and the second and subsequent pages of image data (original data) to be transmitted.

As exemplified in the transmission condition selecting portion 13 and the transmission data generating portion 14, the image data transmitting apparatus 1 is provided with the following image data generating portion. This image data generating portion generates the transmittal cover letter image data as a cover sheet based on the transmittal cover letter data acquired as related to the destination selected by the destination selecting portion 12 and attaches the image data to be transmitted as the second and subsequent pages, thereby generating the image data with the transmittal cover letter attached thereto.

However, in case the transmittal cover letter data is the image data itself of the transmittal cover letter, it is unnecessary to generate the transmittal cover letter image data. With respect to the method of attaching the transmittal cover letter image data to the image data to be transmitted, in the form of transmitting the image data page by page, the image data have to simply be arranged in order and in the form of transmitting the image data as one file, the attachment may be made by arranging in order and combining these types of image data.

The transmission requesting portion 15 makes a request to the communication portion 16 that thus generated image data with the transmittal cover letter attached thereto be transmitted. As exemplified by the transmission requesting portion 15 and the communication portion 16, the image data transmitting apparatus 1 is provided with an image data transmitting portion that transmits the generated image data with the transmittal cover letter attached thereto to the destination.

This image data transmitting portion permits the transmission of only the image data with the transmittal cover letter attached thereto generated by the image data generating portion and prohibits the transmission of other image data. This prohibition means the prohibition of the transmission at other than the transmission information specified in the address book data of the user (namely, the prohibition of the transmission to the destination not selectable by the destination selecting portion 12), the prohibition of the transmission with other than the specified transmittal cover letter (the prohibition of the transmission with changed transmittal cover letter), and further the prohibition of the transmission at the setting not manageable by the server apparatus 2. Therefore, for example, it becomes possible to prohibit the transmission to the destination unrelated to business that is not set by individual users, namely, to prohibit a specific user from transmitting to a specific destination. Various methods may be employed for the prohibition processing and for example, in case the prohibition processing is configured as a control program in the control portion 10, arrangement is to be made so that access to the outside may be made only through such control program.

As described above, according to the present invention, since it is possible to set different transmittal cover letters for respective destinations with respect to the address book assigned to each individual user, when the destination is specified, the image data may be transmitted only with attachment of the user-unchangeable transmittal cover letter corresponding to such destination.

Description will be made of the configuration and the operation of the image data transmitting system configured as described above, giving specific examples. Firstly, description will be made of processing of registering the address book data and the transmittal cover letter data in the server apparatus 2, with reference to FIGS. 2A to 6.

Figures 5A, 5B:
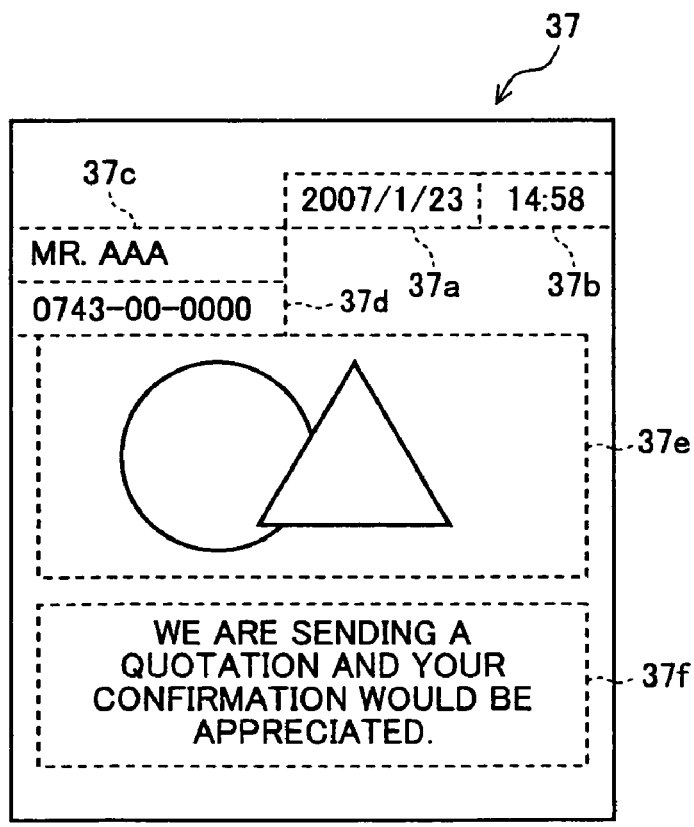
FIGS. 5A and 5B are diagrams of examples of transmittal cover letter data to be registered in the server apparatus of FIG. 1 and transmittal cover letter image data to be ultimately generated by an image data transmitting apparatus from such transmittal cover letter data.

FIGS. 2A and 2B are diagrams of examples of a registration screen of the destination information in the server apparatus of FIG. 1; FIGS. 3A and 3B are diagrams of examples of the registration screen of the destination information for each user in the server apparatus of FIG. 1; FIG. 4 is a diagram of another example of the registration screen of the destination information for each user in the server apparatus of FIG. 1; FIGS. 5A and 5B are diagrams of examples of the transmittal cover letter data to be registered in the server apparatus of FIG. 1 and the transmittal cover letter image data to be ultimately generated by the image data transmitting apparatus from such transmittal cover letter data; and FIG. 6 is a diagram of one example of the address book data to be stored in the server apparatus of FIG. 1.

Creation/registration processing of the address book (destination information) and the transmission setting information may be realized by a registering portion composed of input devices such as a keyboard and a mouse, a display device, and a UI in addition to the memory portion 23 to which the registration is made and the administrator may register on a UI registration screen as exemplified in FIGS. 2A and 2B.

A registration screen 31 of FIG. 2A shows an example of inputting by the administrator on the screen the name of the destination as "AAA", a transmission form (kind of transmission) as FAX, and a destination's address (FAX number in this case) as "0743-00-0000". Furthermore, the registration screen 31 also shows, in respect of the transmission setting information, an example of inputting by the administrator on the screen the transmittal cover letter data as "Sample A", paper size of the image data to be transmitted as "A4", resolution thereof as "200×200 dpi", color mode thereof as "monochrome", file format thereof as "TIF", compression format thereof as "MMR", system of transfer to the administrator (transfer to the PC, etc., used by the administrator) as "E-mail". In this example, only Sample A may be added as the transmittal cover letter and the transmission may not be made with any other transmittal cover letters. Whenever a transmission is made to this receiving party, the transmission is transferred to the administrator by the E-mail.

As described above, it may be so arranged that the transmission setting information contains image limiting information indicative of the size (paper size) of the image data to be transmitted and/or the resolution. It may be so arranged that the image limiting information also includes other information including other listed information. The image data generating portion composed of the transmission data generating portion 14, etc., is designed to be capable of attaching only the image data to be transmitted that matches the size and/or the resolution indicated by the image limiting information. As described above, by so arranging that in the address book data, the transmission setting information such as the paper size and the resolution other than the transmittal cover letter to be attached may be specified, transmission may be made at specific transmission setting information to a specific destination and therefore, the transmission of inappropriate image to an important contractor may be prevented.

In the registration screen 32 of FIG. 2B, as compared with the registration screen 31 of FIG. 2A, the paper size of the image data to be transmitted is selectable as one or more than one of "A3", "A4", "A5", "B4", and "B5", the resolution thereof is selectable as either one or both of "200×200 dpi" and "400×400 dpi", and the compression format is selectable as one or more than one of "MR", "MH", and "MMR". Actually, in the registration screen 32, the administrator has selected to set the transmittal cover letter data as "none" and limit the paper size to either one of "A4", "A5", and "B5", the resolution to "200×200 dpi", and the compression format to "MMR".

In case the setting of the registration screen 32 is made on the server apparatus 2, on the image data transmitting apparatus 1 side as a client, the user may select the paper size out of A4, A5, and B5 and may freely select the transmittal cover letter. In this example, it is so arranged that, in case the transmittal cover letter is not specified, any kind of transmittal cover letter may be transmitted as a cover sheet, but it may be so determined that in such case, transmission is limited to the transmission without any transmittal cover letter.

As exemplified in FIG. 2B, choices selectable by the user (scope of user selection permitted by the administrator) may be set for the transmission setting information. This enables the user to transmit the data to be transmitted that is flexible to a certain extent. Of course, such setting is not necessarily required, as exemplified in FIG. 2A.

While FIGS. 2A and 2B show examples of registering the destination information and the transmission setting information without specifically limiting the users, the user to whom these pieces of information are applicable may be later selected and memorized. As exemplified in FIGS. 3A, 3B, and 4, the user to whom these pieces of information are applicable may also be input at the time of registration.

The registration screen 33 exemplified by FIG. 3A is for User 1, the registration screen 34 exemplified by FIG. 3B is for User 2, and the registration screen 35 exemplified by FIG. 4 is for Users 1 and 3.

On the other hand, with respect to the transmittal cover letter data, only the design (dimensions, position and kind of a frame) of the transmittal cover letter is required to be kept, like the transmittal cover letter data 36 exemplified by FIG. 5A. In the transmittal cover letter data 36, the first line indicates the frame the kind of which is "date", the start point of which is (100, 10), and the dimensions of which are (50, 10). Like an image frame at the fifth line and a text frame at the sixth line, the image file name (here, sample.bmp) and the character string to be drawn within the frame (here, "we are sending a quotation and your confirmation would be appreciated") may also be specified. These formats are predetermined and the image data transmitting apparatus 1 generates the transmittal cover letter image according to such formats.

The transmittal cover letter image data to be generated by the transmission data generating portion 14 of the image data transmitting apparatus 1 based on the transmittal cover letter data of FIG. 5A will be like the image data 37 of FIG. 5B. The image data 37 comprises a date frame 37a, a time frame 37b, a destination's name frame 37c, an address frame 37d, an image frame 37e, and a text frame 37f and the data corresponding to these frames is read in by the transmission data generating portion 14 basically from the server apparatus 2 and the transmittal cover letter image data is drawn (generated). For example, the destination's name frame 37c and the address frame 37d may be acquired from the information on the destination selected by the user and the information to be read into the image frame 37e and the text frame 37f may be stored in advance in the transmittal cover letter memory portion 25 as a part of the transmittal cover letter data and may be acquired from there. As to the date frame 37a and the time frame 37b, preferably, present date and time of the server apparatus 2 are drawn within these frames. The transmission data generating portion 14 adds thus generated transmittal cover letter image data as the first page of the original, thereby generating the image data with the transmittal cover letter attached thereto.

The information on the transmittal cover letter data is related to the address book data and, with respect to the transmittal cover letter data itself, as shown in FIG. 5A, the design, the text, etc., of the transmittal cover letter to be attached may be specified by the administrator. Therefore, since the transmission may be made at a specific format for a combination of a specific user and a specific destination, the transmission of an inappropriate image to an important contractor may be prevented.

The address book data 38 exemplified by FIG. 6 retains the destination information comprising the name, the transmission form (kind), and the address and additionally the permitted user name and the transmission setting information. By setting a plurality of permitted users for the same destination, a plurality of destinations are retained. For example, since User 1 and User 2 are permitted for the same destination of "AAA", two destinations are retained. The relationship between the image data transmitting apparatus 1 and the user is not limited to one-to-one relationship but may be one-to-multiple relationship, multiple-to-one relationship, or multiple-to-multiple relationship. Therefore, it is preferable to manage the address book data as the data for each user as exemplified by FIG. 6 rather than as the data for each image data transmitting apparatus 1.

While FIG. 6 shows the example of storing the permitted user name, it may be so arranged that each user has the authority corresponding to his office, etc., set (ranked) and that the rank of the user is stored that is permitted to transmit in light of the relationship between the destination and the transmittal cover letter information. Namely, it may be so arranged that the transmission setting information contains transmission permit/non-permit information indicating whether to permit the transmission to the destination. In such case, the destination selecting portion 12 makes selectable only the destination for which the transmission permit/non-permit information indicates the transmission permit.

Figure 7A:
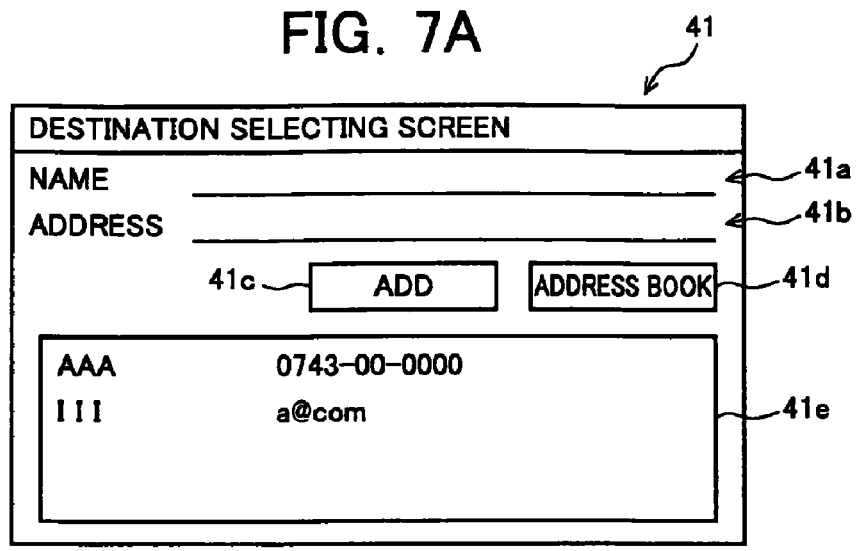
FIGS. 7A to 7C are diagrams of one example of a series of destination selecting screens in the image data transmitting apparatus of FIG. 1.
Figure 7B:
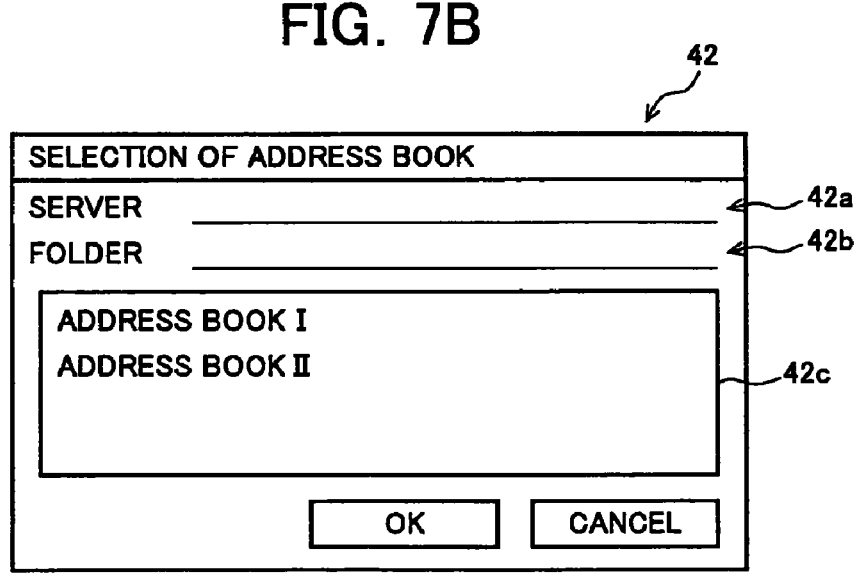
Figure 7C:
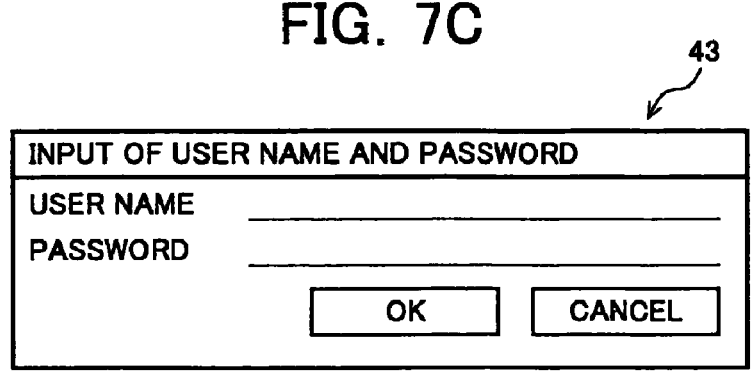
Figure 8A:
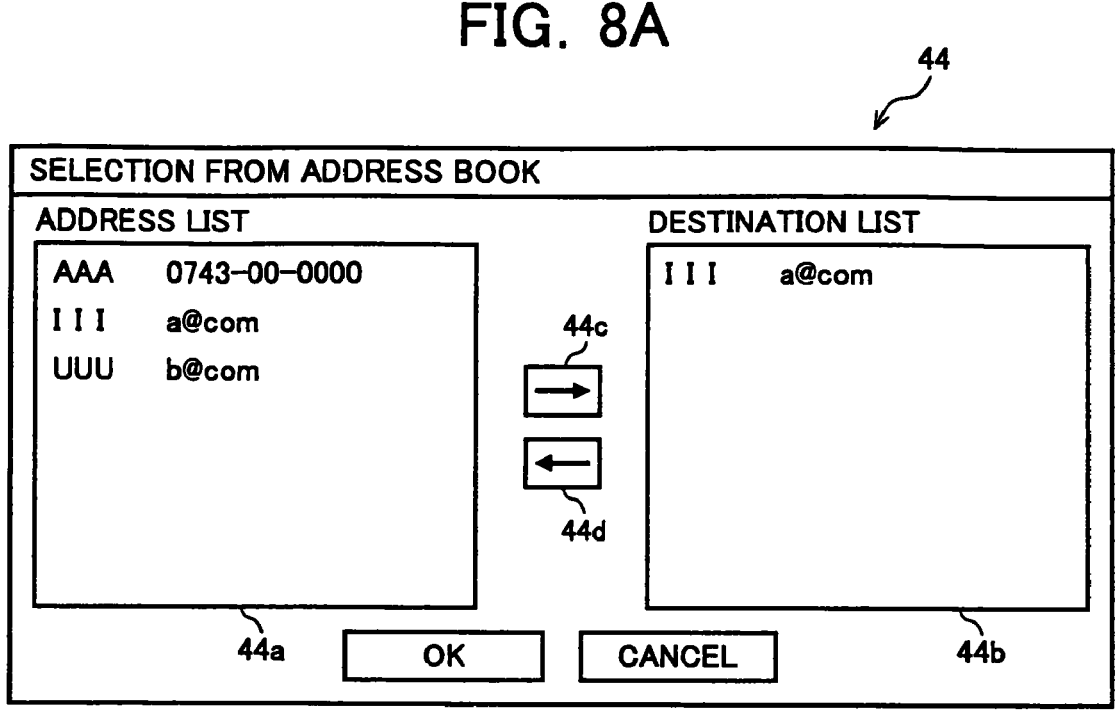
FIGS. 8A and 8B are diagrams of examples of the destination selecting screens subsequent to FIGS. 7A to 7C.
Figure 8B:
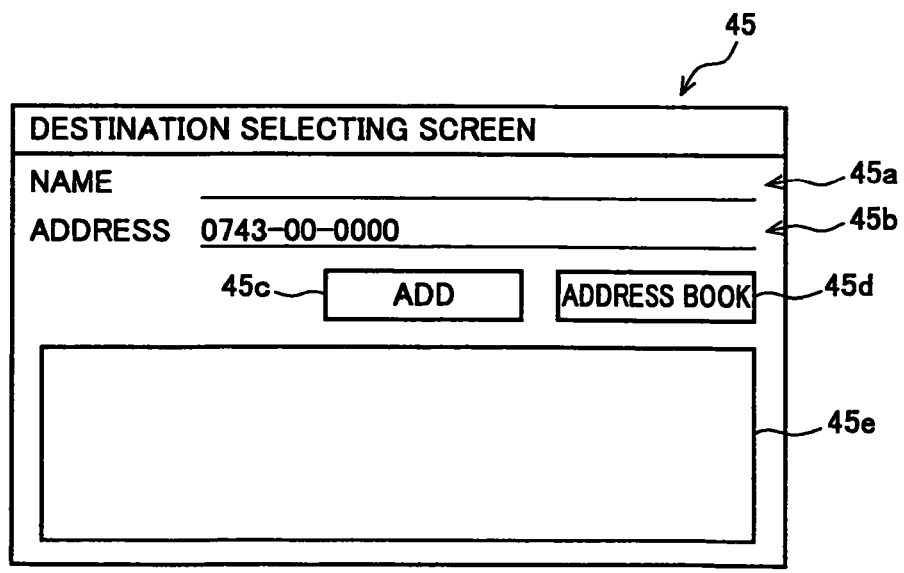

Next, description will be made of destination selecting processing in the image data transmitting apparatus 1, with reference to FIGS. 7A to 7C and FIGS. 8A and 8B. FIGS. 7A to 7C are diagrams of one example of a series of destination selecting screens in the image data transmitting apparatus of FIG. 1; and FIGS. 8A and 8B are diagrams of examples of the destination selecting screens subsequent to FIGS. 7A to 7C.

The destination selecting processing in the image data transmitting apparatus 1 may be realized at the destination selecting portion composed of the input device such as the keyboard and the mouse, the display device, and the UI and the user may make selection with the UI as exemplified by a series of screens 41 to 45 of FIGS. 7A to 7C and FIGS. 8A and 8B.

The destination selecting screen 41 of FIG. 7A shows a name input space 41a, an address input space 41b, an add button 41c for adding the destination, an address book button 41d for selecting the address book, and a selected destination display space 41e for listing up the destinations being selected. Here, it is preferable to gray out the name input space 41a and the address input space 41b so that direct input of the name and the address is prohibited and only selection from the address book is permitted.

If the address book button 41d is selected on the destination selecting screen 41, then the address book selecting screen 42 of FIG. 7B is displayed and the user is prompted to specify a name of the server 42a in which the address book is kept, a folder name 42b in the server, and an address book name 42c. The address book selecting screen 42 may be arranged so that the server apparatus 2 having the address book data is automatically searched for on the network or the address book is specified in advance. In the address book name space 42c, selectable address books are displayed. While the screen shows the example of displaying address books I and II as the address book name 42c, it may be so arranged that one of them will be prepared as the address book registering a group of destinations the transmission to which is not restricted by the transmission setting information including the transmittal cover letter.

By selecting one of the address books, a confidence information input screen 43 of FIG. 7c is displayed and the user is prompted to input confidence information (user name, password, etc.). It may be so arranged that at the time of acquiring only specific address book data, the user is requested to input the confidence information. At the stage where the confidence information has been sent to the server apparatus 2 and has been authenticated by the server apparatus 2, the image data transmitting apparatus 1 is caused to display for the first time the address (destination) selecting screen 44 of FIG. 8A so that the address book may be acquired. As described above, it is preferable to so arrange that only when the confidence information received from the user is determined to be correct by the server apparatus 2, the data acquiring portion exemplified by the address book acquiring portion 11, etc., causes the user to acquire the information on the destinations and the transmittal cover letter data corresponding to the user. By requiring the confidence information to be input, it is possible to prevent a person in the disguise of the user from acquiring the address book data.

The destination selecting screen 44 of FIG. 8A shows an address list 44a of tabulated addresses assigned to the user from the address book data, a selected list (destination list) 44b displaying a list of destinations selected from the address list 44a, a selection button 44c for executing the selection, and a release button 44d for releasing the selection. As described above, when the input user information is authenticated, the address book registered for the user is displayed and may be added to the destination list.

Otherwise, it may be so arranged that, at the time of displaying of the destination selecting screen 41 of FIG. 7A, as shown by the destination selecting screen 45 of FIG. 8B, the user may manually input the address at an address input space 45b or the user may manually input the destination' name at a name input space 45a. The destination selecting screen 45 as well displays an add button 45c, an address book button 45d, and a selected destination display space 45e. In this case, it may be so arranged that judgement is made of whether a matching address or destination's name is present in the registered address book data and the matching address or destination's name may be added to the destination list. For example, when the user inputs "0743-00-0000" at the address input space 45b and if the number is found registered in the address book, the destination is judged to be, for example, "AAA" and the transmission limitation according to the transmission setting information set for "AAA" may be performed.

Figure 9:
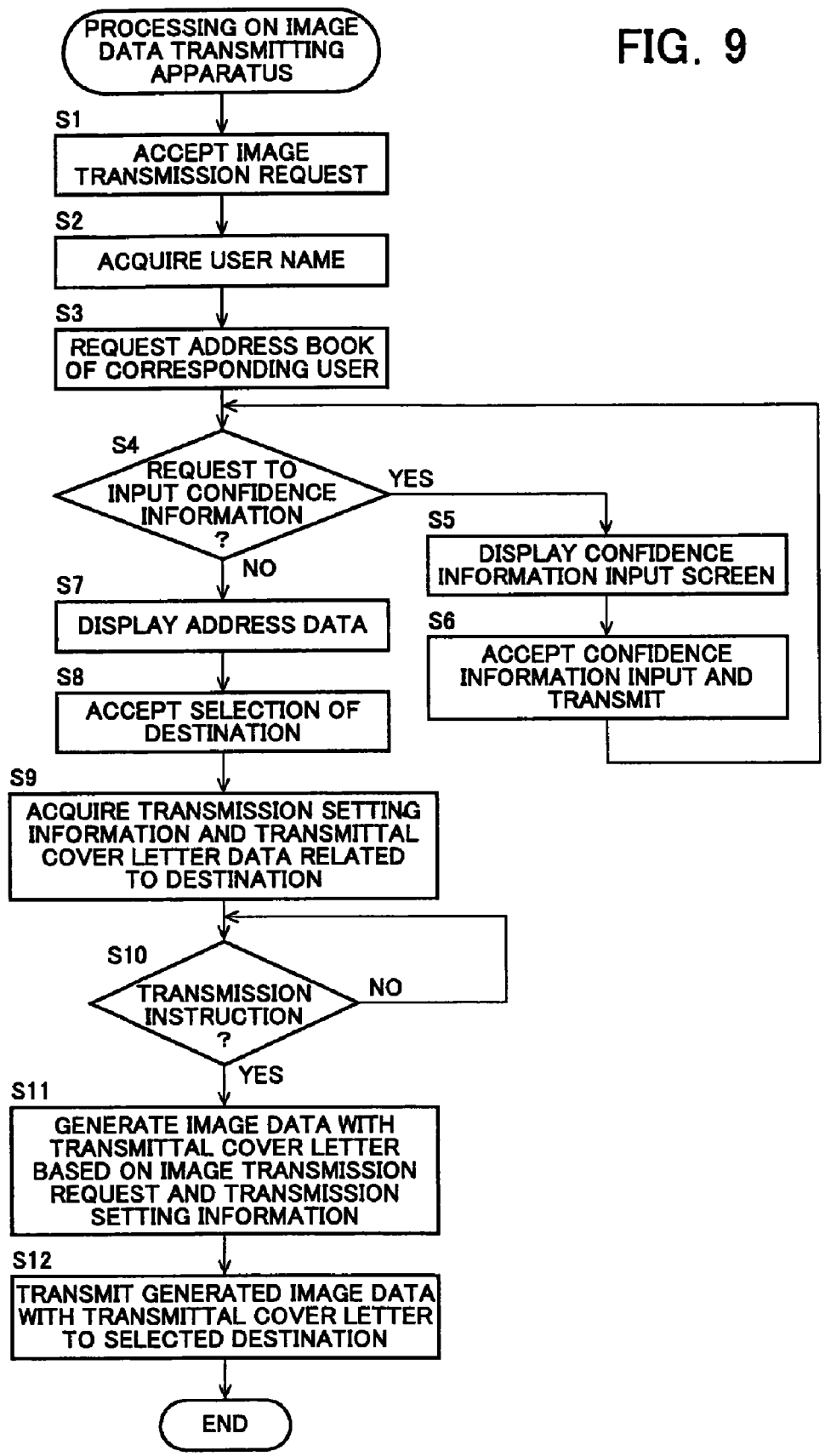
FIG. 9 is a flow chart for description of one example of image data transmission processing in the image data transmitting system of FIG. 1 and is a flow chart for description of an example of processing on the image data transmitting apparatus side.
Figure 10:
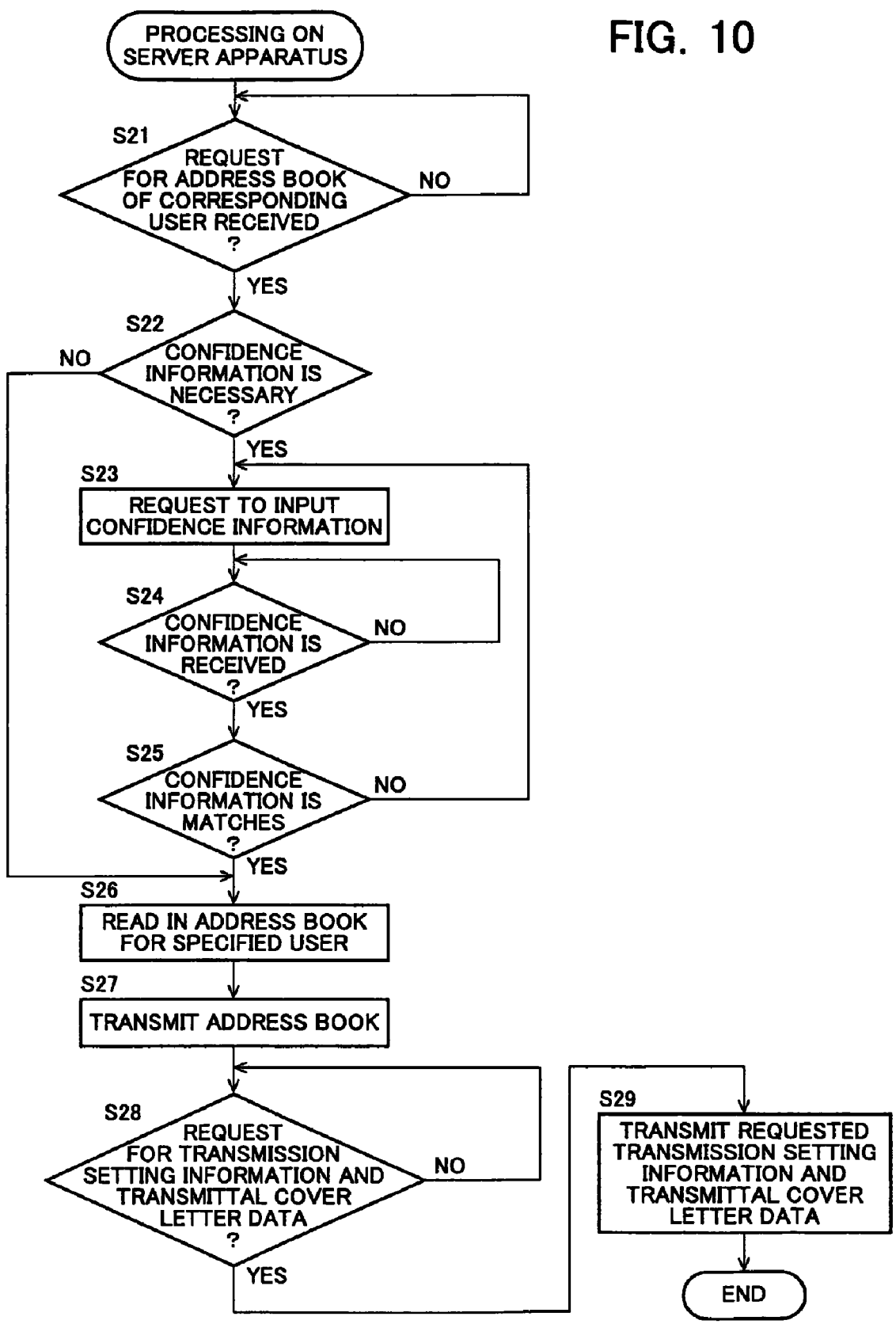
FIG. 10 is a flow chart for describing an example of processing on the server apparatus side corresponding to the processing of FIG. 9.

FIGS. 9 and 10 are flow charts for description of one example of image data transmission processing in the image data transmitting system of FIG. 1 and FIG. 9 shows an example of processing on the image data transmitting apparatus side and FIG. 10 shows an example of processing on the server apparatus side corresponding to the processing of FIG. 9.

Firstly, when the user requests image transmission, specifying the image data to be transmitted, the image data transmitting apparatus 1 accepts such request (step S1) and the address book acquiring portion 11 acquires the user name (step S2). Specifying of the image data to be transmitted (image reading, file specifying, etc.) may be executed before transmission instruction (to be described later at step S10).

Next, the address book acquiring portion 11 executes a request to acquire the address book (information on destinations) matching the acquired user name to the server apparatus 2 by way of the communication portion 16 (step S3). The address book acquiring portion 11 determines whether there is a request to input the confidence information from the server apparatus 2 in response (step S4) and, only in the case of YES, displays the confidence information input screen (step S5), accepts the input of the confidence information, sends it to the server apparatus 2, and waits for result of authentication (step S6). If there is no input request or when the authentication is successful, the flow goes to step S7.

At step S7, the address book acquiring portion 11 acquires the address book corresponding to the user from the server apparatus 2 and displays the screen by the UI. Following step S7, the destination selecting portion 12 accepts the selection by the user of the destination (step S8). The address book acquiring portion 11 sends the request to acquire the transmission setting information and the transmittal cover letter data related to the destination selected at step S8 to the server apparatus 2 by way of the communication portion 16 and acquires such information and data (step S9). In response to this acquisition, the destination selecting portion 12 changes the UI and the user performs the selection setting (for example, selection out of "A4", "A5", and "B5" as shown in FIG. 2B) of the transmission setting information based on the changed UI.

Then, the transmission requesting portion 15 determines whether a transmission instruction is accepted from the user (step S10) and when the transmission instruction is accepted, the transmission data generating portion 14, based on the image data to be transmitted accompanying the image transmission request at step S1 and the transmission setting information acquired at step S9, generates the transmittal cover letter image data and attaches it to the image data to be transmitted, thereby generating the image data with the transmittal cover letter attached thereto (step S11). Then, the transmission requesting portion 15 executes the transmission of thus generated image data with the transmittal cover letter attached thereto by way of the communication portion 16 (step S12).

On the other hand, the server apparatus 2 determines whether the request at step S3 is received (step S21) and only if the request is received, the following processing is executed. Firstly, the server apparatus 2 judges whether the input of the confidence information is necessary for the transmission of the address book (step S22) and if the confidence information is necessary, then the server apparatus 2 transmits the request to input the confidence information to the image data transmitting apparatus 1 (step S23). Next, the server apparatus 2 waits for the reception of the confidence information transmitted at step S6 (step S24) and determines whether the received confidence information matches (step S25). If the confidence information does not match (can not be authenticated) at step S25, then the flow goes back to step S23 and the request is again transmitted to the image data transmitting apparatus 1.

If the confidence information is not necessary at step S22 and if the confidence information matches at step S25, then the server apparatus 2 reads in the address book for the specified user (step S26) and transmits the address book to the image data transmitting apparatus 1 (step S27) Next, the server apparatus 2 waits for the request to acquire the transmission setting information and the transmittal cover letter data at step S9 (step S28) and when the request is received, the requested data is transmitted to the image data transmitting apparatus 1 (step S29).

Figure 11:
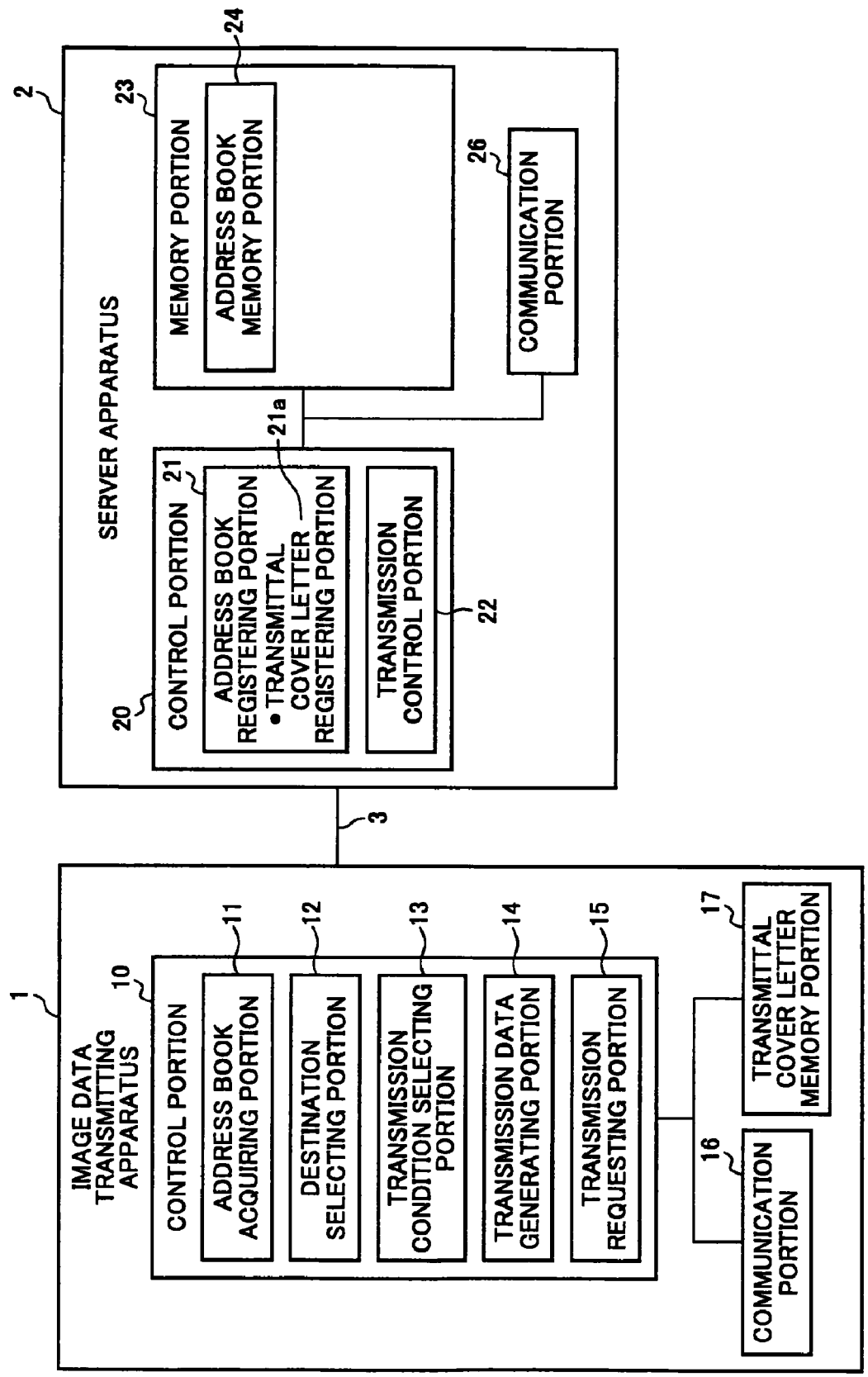
FIG. 11 is a block diagram of one configuration example of the image data transmitting system according to another embodiment of the present invention.

FIG. 11 is a block diagram of one configuration example of the image data transmitting system according to another embodiment of the present invention. The image data transmitting system exemplified by FIG. 11 is a system in which the transmittal cover letter memory portion 25 in the system exemplified by FIG. 1 is provided not in the server apparatus 2 but in the image data transmitting apparatus 1 as a transmittal cover letter memory portion 17. The transmittal cover letter memory portion 17 is composed of the memory means such as the hard disc.

As described above, in the image data transmitting system exemplified by FIG. 11, the server apparatus 2 stores the address book data in which the information on the destinations, the information on the users who use the image data transmitting apparatus 1, and the transmission setting information indicative of the transmittal cover letter data to be used are related to each other, while the image data transmitting apparatus 1 stores the transmittal cover letter data.

Therefore, the difference in the processing from the system of FIG. 1 is that the image data transmitting apparatus 1 is not required to acquire the transmittal cover letter data. The transmittal cover letter data to be stored in the transmittal cover letter memory portion 17 is related beforehand as the transmission setting information of the address book data in the server apparatus 2 and may be obtained by storing the data distributed by way of the network 3 or by way of a recording medium. However, this transmittal cover letter data is not to be changed at the image data transmitting apparatus 1.

While description has been made of each embodiment of the image data transmitting system, the image data transmitting apparatus, and the server apparatus of the present invention, with reference to FIGS. 1 to 11, the present invention may assume the form of the program to be installed in the image data transmitting apparatus and the program to be installed in the server apparatus. These programs are those exemplified as the control program in the control portion 10 and the control program in the control portion 20. Namely, the former control program is the program that, installed in the control portion 10 in the image data transmitting apparatus 1, causes the control portion 10 to function as above respective portions of the image data transmitting apparatus 1 and the latter program is the program that causes a computer to function as above respective portions of the server apparatus 2.

In other words, the program on the image data transmitting apparatus 1 side is the program that causes the control portion 10 of the image data transmitting apparatus 1 to execute a data acquiring step of acquiring the address book data corresponding to the user or the address book data and the transmittal cover letter data from the server apparatus 2, a destination selecting step of selecting the destination according to the selecting operation by the user out of the acquired information on the destinations, an image data generating step of generating the transmittal cover letter image data based on the transmittal cover letter data related to the selected destination and attaching the image data to be transmitted as the second and subsequent pages, thereby generating the image data with the transmittal cover letter attached thereto, and an image data transmitting step of transmitting the generated image data with the transmittal cover letter attached thereto to the destination. This image data transmitting step is to prohibit the transmission of any image data other than the image data with the transmittal cover letter attached thereto generated at the image data generating step.

The program on the server apparatus 2 side is the program that causes the computer to execute a registering step of storing the address book data (and the transmittal cover letter data) in which the information on the destinations, the information on the users who use the image data transmitting apparatus, and the transmission setting information indicative of the transmittal cover letter data to be used are related to each other in the memory portion and a data transmitting step of reading out, in response to the request to acquire from the image data transmitting apparatus 1, the requested address book data corresponding to the user of the image data transmitting apparatus 1 or the address book data and the transmittal cover letter data from the memory portion and transmitting the data.

These programs may be distributed as a computer-readable recording medium on which the programs are recorded or by way of the network and may be incorporated in an executable form into the image data transmitting apparatus and the server apparatus.

According to the present invention, when the destination is specified, the image data may be transmitted solely with attachment of the user-unchangeable transmittal cover letter corresponding to such destination.

The invention claimed is:

1. An image data transmitting apparatus connected to a server apparatus by way of a network, the server apparatus having stored thereon address book data in which information on destinations, information on users who use the image data transmitting apparatus, and transmission setting information indicative of transmittal cover letter data to be used are related to each other, the image data transmitting apparatus or the server apparatus having the transmittal cover letter data stored thereon, the image data transmitting apparatus comprising:

a data acquiring portion that acquires the address book data corresponding to the user and the transmittal cover letter data from the server apparatus;

a destination selecting portion that, out of the information on destinations as acquired by the data acquiring portion, selects one of the destinations according to a selecting operation by the user;

an image data generating portion that generates image data of a transmittal cover letter based on the transmittal cover letter data related to the destination selected by the destination selecting portion and attaches image data to be transmitted as second and subsequent pages, thereby generating the image data with the transmittal cover letter attached thereto; and an image data transmitting portion that transmits the image data with the transmittal cover letter attached thereto generated by the image data generating portion to the destination, wherein the image data transmitting portion prohibits transmission of image data other than the image data with the transmittal cover letter attached thereto generated by the image data generating portion, and prohibits transmission of the transmittal cover letter and the image data to another destination not selected by the destination selecting portion.

2. The image data transmitting apparatus as defined in claim 1, wherein the transmission setting information contains transmission permit/non-permit information indicating permit or non-permit of the transmission to the destination, and wherein the destination selecting portion is designed to be capable of selecting only the destination for which the transmission permit/non-permit information indicates the transmission permit.

3. The image data transmitting apparatus as defined in claim 1, wherein the transmission setting information contains image limiting information indicative of the size and/or the resolution of the image data to be transmitted, and wherein the image data generating portion is designed to be capable of attaching only the image data to be transmitted that matches the size and/or the resolution indicated by the image limiting information.

4. The image data transmitting apparatus as defined in claim 2, wherein the transmission setting information contains image limiting information indicative of the size and/or the resolution of the image data to be transmitted, and wherein the image data generating portion is designed to be capable of attaching only the image data to be transmitted that matches the size and/or the resolution indicated by the image limiting information.

5. The image data transmitting apparatus as defined in any one of claims 1 to 4, wherein the data acquiring portion, only when confidence information received from the user is determined to be correct by the server apparatus, is designed to be capable of acquiring the address book data corresponding to the user or such address book data and the transmittal cover letter data.

6. An image data transmitting system including a server apparatus and an image data transmitting apparatus connected to the server apparatus by way of a network, the server apparatus having stored thereon address book data in which information on destinations, information on users who use the image data transmitting apparatus, and transmission setting information indicative of transmittal cover letter data to be used are related to each other, the image data transmitting apparatus or the server apparatus having the transmittal cover letter data stored thereon, the image data transmitting apparatus comprising:

a data acquiring portion that acquires the address book data corresponding to the user and the transmittal cover letter data from the server apparatus;

a destination selecting portion that, out of the information on destinations acquired by the data acquiring portion, selects one of the destinations according to a selecting operation by the user;

an image data generating portion that generates image data of a transmittal cover letter based on the transmittal cover letter data related to the destination selected by the destination selecting portion and attaches the image data to be transmitted as second and subsequent pages, thereby generating the image data with the transmittal cover letter attached thereto; and an image data transmitting portion that transmits the image data with the transmittal cover letter attached thereto generated by the image data generating portion to the destination, wherein the image data transmitting portion prohibits transmission of image data other than the image data with the transmittal cover letter attached thereto generated by the image data generating portion, and prohibits transmission of the transmittal cover letter and the image data to another destination not selected by the destination selecting portion.

7. A program embodied in a non-transitory computer readable medium of an image data transmitting apparatus connected to a server apparatus by way of a network, the server apparatus having stored thereon address book data in which information on destinations, information on users who use the image data transmitting apparatus, and transmission setting information indicative of transmittal cover letter data to be used are related to each other, the image data transmitting apparatus or the server apparatus having the transmittal cover letter data stored thereon, the program operable to drive the control portion of the image data transmitting apparatus to execute:

a data acquiring step of acquiring the address book data corresponding to the user and the transmittal cover letter data from the server apparatus;

a destination selecting step of selecting, out of the information on destinations acquired by the data acquiring step, one of the destinations according to a selecting operation by the user;

an image data generating step of generating image data of a transmittal cover letter based on the transmittal cover letter data related to the destination selected by the destination selecting step and attaching the image data to be transmitted as second and subsequent pages, thereby generating the image data with the transmittal cover letter attached thereto; and an image data transmitting step of transmitting the image data with the transmittal cover letter attached thereto generated by the image data generating step to the destination, wherein the image data transmitting step includes prohibiting transmission of image data other than the image data with the transmittal cover letter attached thereto generated by the image data generating step, and prohibiting transmission of the transmittal cover letter and the image data to another destination not selected in the destination selecting step.

* * * * *